United States Patent [19]
Li et al.

[11] Patent Number: 5,240,481
[45] Date of Patent: Aug. 31, 1993

[54] PROGRAMMABLE CONTROL AND OPERATION EQUIPMENT OF SWING PRESSURE ADSORPTION PROCESS

[75] Inventors: Dong-Lin Li; Yi-Jiang Tang; Jiong-Liang Yang; Chong-Gang Zhang; De-Gao He, all of Chengdu, China

[73] Assignee: Chengdu Huaxi Chemical Engineering Research Institute, Chengdu, China

[21] Appl. No.: 923,502

[22] Filed: Aug. 3, 1992

[30] Foreign Application Priority Data

Aug. 14, 1991 [CN] China ............................ 91107269.1

[51] Int. Cl.$^5$ ............................................. B01D 53/04
[52] U.S. Cl. ........................................ 96/109; 55/212; 55/271; 96/133
[58] Field of Search .................... 55/18, 20, 21, 25, 26, 55/62, 68, 160–163, 179, 210, 212, 271

[56] References Cited

U.S. PATENT DOCUMENTS

| | | | |
|---|---|---|---|
| 1,887,606 | 11/1932 | Thomas | 55/162 |
| 3,160,486 | 12/1964 | Busch, Jr. | 55/162 |
| 3,775,946 | 12/1973 | Brazzel | 55/161 X |
| 3,898,047 | 8/1975 | Cramer | 55/25 X |
| 4,101,298 | 7/1978 | Myers et al. | 55/163 |
| 4,205,967 | 6/1980 | Sandman et al. | 55/21 |
| 4,234,322 | 11/1980 | De Meyer et al. | 55/18 |
| 4,247,311 | 1/1981 | Seibert et al. | 55/162 |
| 4,299,595 | 11/1981 | Benkmann et al. | 55/21 |
| 4,322,228 | 3/1982 | Myers et al. | 55/163 |
| 4,360,362 | 11/1982 | Asztalos | 55/21 |
| 4,631,073 | 12/1986 | Null et al. | 55/18 |
| 5,137,549 | 8/1992 | Stanford et al. | 55/26 |
| 5,154,737 | 10/1992 | Jenkins et al. | 55/26 |

*Primary Examiner*—Robert Spitzer
*Attorney, Agent, or Firm*—Roylance, Abrams, Berdo & Goodman

[57] ABSTRACT

A programmable control and operation system is applied in a swing pressure adsorption process. The system comprises a computer, a driving device, and a plurality of programmable control valve assemblies. The programmable control valve assembly comprises an operating valve with at least one cavity for sealing control, a valve core, a sealing ring, an operation device, a sealing control valve, and a valve position detector. The operation of the sealing control valve is dependent on the open or closed position of the valve and the process of opening and closing the valve. The sealing control valve feeds a sealing control medium at a pressure to the cavity for sealing the operating valve. The sealing control medium acts on the sealing ring to increase the pressure at the valve core to seal the operating valve. The control and operation system provide independent control of the sealing valve and operating valve to increase reliability and durability.

18 Claims, 14 Drawing Sheets

PROGRAMMABLE CONTROL AND OPERATION EQUIPMENT OF SWING PRESSURE ADSORPTION PROCESS

TECHNICAL FIELD OF THE INVENTION

The present invention relates to control of a swing pressure adsorption (SPA) system, and more particularly, to a programmable control and operation equipment incorporated to a SPA unit of a gas separation equipment.

BACKGROUND OF THE INVENTION

Swing pressure adsorption process is a technique widely used for separating and purifying of gas mixture in chemical, petroleum and metallurgical industries. It is well known that a specific adsorbent can selectively a adsorb specific gas at an elevated pressure and release it again by depressurization. SPA process provides means for separating and purifying a multicomponent gas stream containing at least two gases having different adsorption characteristics. For example, it may be desired to remove carbon monoxide, carbon dioxide and light hydrocarbons from a hydrogen-containing feed stream to produce a purified hydrogen stream for a hydrocracking or other catalytic process where these impurities are highly adsorbable gases while the hydrogen is less adsorbable.

A set of SPA equipment generally comprises a plurality of adsorption beds filled with adsorbent. During operation, each adsorption bed works sequentially and cyclically as: pressurizing, adsorbing, cocurrent depressurizing, counter-current depressurizing, and purging at a predetermined programme. For different adsorption beds, sequences of process are staggered so that the intermittent operations of different beds constitutes a continuous operation of a SPA equipment.

Generally, the above-mentioned operation is carried out by a programmable control and operation equipment incorporated with the SPA equipment.

The prior art of SPA equipment is widely equipped with computer, pneumatic driving device and ordinary pneumatic operated valves; and others are equipped with computer, electrical driving devices, and ordinary electric operated valves. The general existing problems in valves are low reliability, low hermetization, and short life. In De. Meyer's U.S. Pat. No. 4234322, in case any valve defect happens, the defected valve and its corresponding adsorption bed would be isolated from the system, and the remaining beds will be operated according to a new mode. Such treatment can avoid the whole set from shut down at the sacrifice of the output. Besides, as shown in FIG. 1 of the Patent, all the nine adsorption beds use the same valve (No. 101) to pressurize the product gas. Thus, should this valve fail, the whole unit would have to be shut down. As shown in Publication No. CN 1031660A in the name of Union Carbide Corporation of USA, it describes a modified system of the ordinary SPA process. In this system, the reliability is improved by elimination of several valves, including a system-dependent valve. However, in case that when a valve is in fault, it will still cause the whole or part of the SPA equipment to be shut down.

From the above mentioned patents, it is shown that none of them has attempted to improve the operation stability and reduce the occurrence of defect of the whole SPA process by means of improving the reliability and life of their programmable control and operation devices.

OBJECT OF THE INVENTION

The object of the invention is that, in order to overcome the technical deficiency of the prior art, designing a driving device of high reliability, and a programmable control valve assembly of high reliability, good hermetization and long life, so as to improve the operation stability of the whole SPA process and reduce the occurrence of defects.

SUMMARY OF THE INVENTION

In order to attain the above-mentioned object, the present invention provides the programmable control and operation equipment of SPA comprising computer, driving devices, and a plurality of programmable control valve assembly.

Said programmable control valve assembly comprises an operative valve, a sealing control valve, and an operation device.

Said operating valve comprises a valve stem and a valve core. There is a sealing ring situated around the periphery of the valve core. Whether this sealing ring is at the sealing state or not is determined by the pressure of the pressure transmission medium in at least one cavity inside the operating valve to push a sliding sleeve so as to cause the sealing ring in butt contact against the valve core.

And the pressure of the pressure transmission medium inside the cavities is controlled by the sealing control valve.

The operation device controls the change over operation of the sealing control valve, and also controls the relevant operations of the operating valve, to make the valve at open or close state and the process of opening or closing correspondingly.

There is also equipped with a valve position detecting device, which may detect the valve position and feedback the signal into the computer.

There is also equipped with a sealing control device to supply sealing control medium for operating valve.

The control process is shown as follows: when operating valve works at close state, sealing control valve will let the high pressure sealing control medium to admit into the cavity for sealing of the operating valve, thus drives the sliding sleeve to exert a force on the sealing ring at the periphery of the operating valve core, hence makes the sealing ring in butt contact against the valve core, and assures the hermetization of the operating valve; when the operating valve is in operation mode, or at the state of open, the sealing control valve makes the low pressure sealing control medium come into the cavity for sealing, therefore the force acted on the operating valve core by the sealing ring is greatly reduced and hence assures the operating valve to work easily and reliably, thereby the wear of the valve core and the sealing ring is greatly reduced, the life of the valve becomes much longer. Besides, the sliding sleeve in butt contact against the valve core can also automatically compensate the wear of the sealing ring and the valve core if there were wear existed. Moreover, the pressure valve of the sealing control device may arbitrarily regulate the above-mentioned two kinds of pressure.

Furthermore, the present invention further comprises a separating device to separate the working medium in operating valve from sealing control medium in the cavity for sealing of the operating valve.

The present invention, further comprises an oil pressure supplying system used for hydraulic driving purpose, and in the oil system there is provided also an integrated oil path block header to concentrate all the oil paths of solenoid cross-over valves on the block header.

According to the present invention, a sealing control valve operated by the driving device is designed, which comprises a cross-over valve and a programmable valve.

According to the present invention, part of the driving device may be used to substitute the sealing control device.

According to the present invention, the raw gas for the SPA equipment may also be used as the medium of sealing control.

According to the present invention, the product gas for the SPA equipment may also be used as the medium of sealing control.

As previously mentioned, a pressure oil unit is used for driving device, which, in comparison with the current ordinary technique of pneumatic or electric drive equipment, can make the operating valve to operate more steadily and reliably.

When the operating valve is closed, the force exerted on the valve core by the sealing ring is at its maximum, and it can be regulated, thus it assures the hermetization of the operating valve.

When the operating valve is in operation and also when it is at open state, the force exerted on the valve core by the sealing ring is greatly reduced (and it is regulatable), therefore it assures the sealing ring and the valve core of the operating valve with small wear and long life, and also keeps the valve to be operated easily and reliably.

The sealing ring of the operating valve may automatically compensate the wear itself and the valve core too, hence it further increases the hermetization and working life of the operating valve.

Working medium of operating valve and sealing control medium of operating valve as isolated by an isolating device, hence no mutual pollution is possible in any way.

Detector of valve position of operating valve will feedback signals to the computer to ensure the computer to monitor and control the operation of the operating valve.

BRIEF DESCRIPTION OF THE DRAWINGS

The invention will be better understood and its advantages will become more apparent when the following detailed description is read with reference to the accompanying drawings wherein.

DETAILED DESCRIPTION OF PREFERRED EMBODIMENTS

Figure 2:
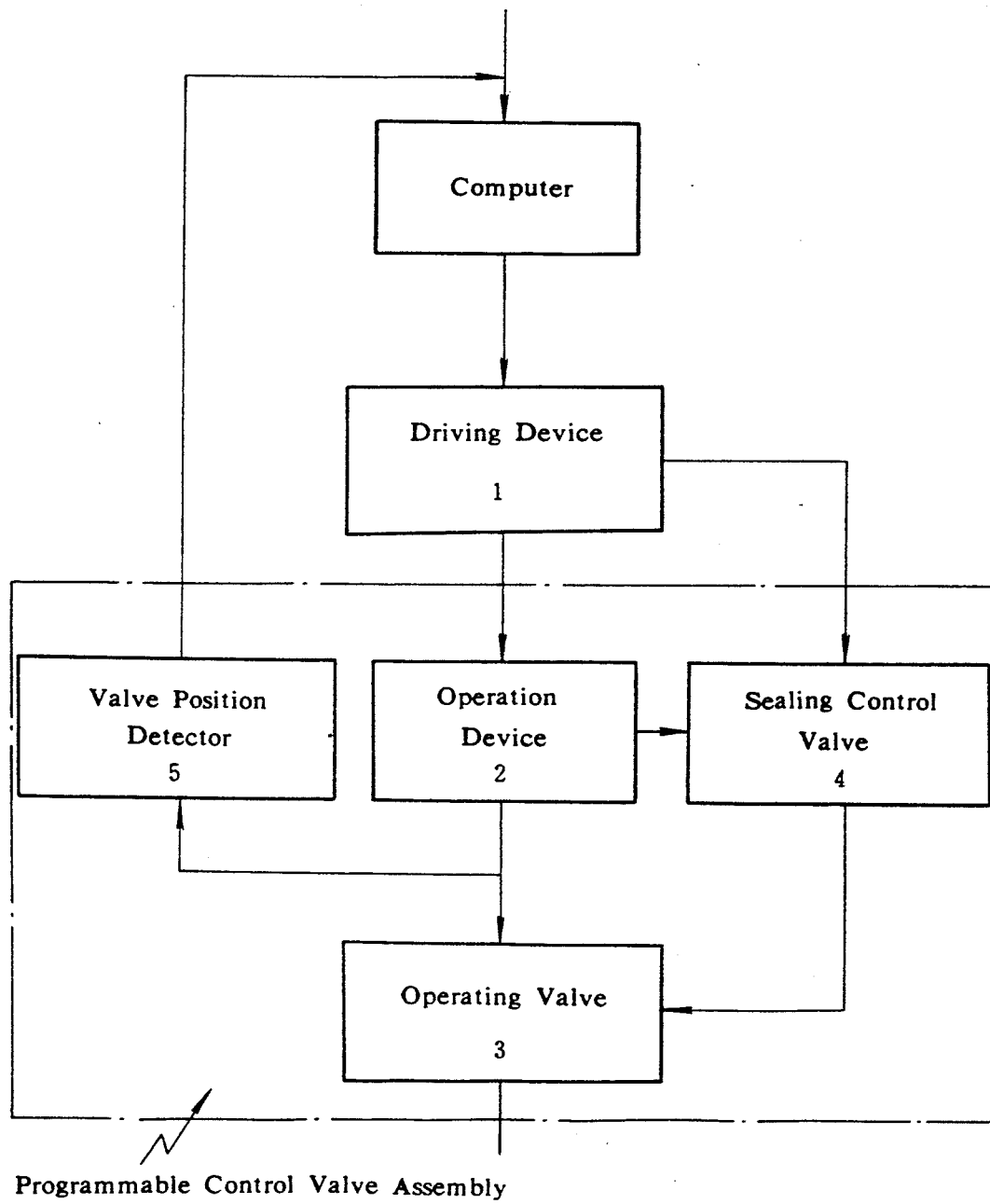
FIG. 2 is another block diagram with modified embodiment of the programmable control and operation equipment of SPA of FIG. 1.

Referring to FIG. 2, programmable control and operation equipment of SPA comprises a computer, a driving device and a plurality of programmable control valve assembly. As the constitution and control process of each programmable control valve assembly are entirely the same, thereby only one of the programmable control valve assembly is described as an example in this embodiment description.

As shown in FIG. 2, a computer controls solenoid cross-over valves 113 of driving device 1 according to a predetermined programme of SPA process. The computer has the following functions: issues the control signals, displays the working states, receives the feedback signals from the valve position detecting device, and makes out decisions of regulation by processing these feedback signal data. In this invention, programmable control can be made by means of EX 80 Programmable Controller, Toshiba, Japan, or an integrated and distributed control system of 9000 series made by Honeywell Co., USA.

Figure 5:
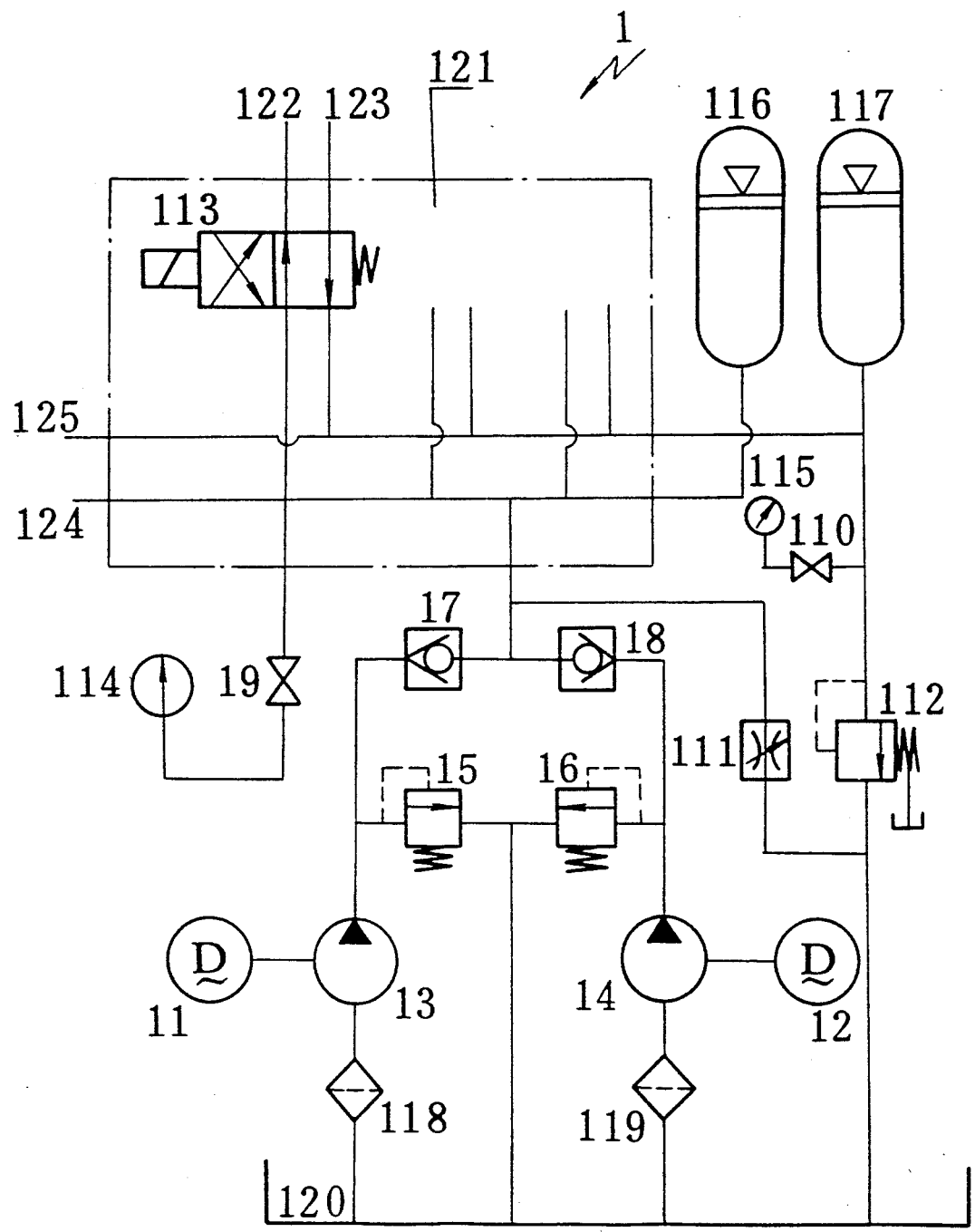
FIG. 5 is as schematic diagram showing the working principle of a driving device in FIGS. 2 and 3.

The driving device is a hydraulically operated device, its working principle is shown in FIG. 5. It comprises: electric motors 11, 12, oil pumps 13, 14, overflow valves 15, 16, check valves 17, 18, pressure gage cocks 19, 110, throttle valve 111, back pressure valve 112, solenoid cross-over valve 113, pressure gages 114, 115, hydraulic accumulators 116, 117, strainers 118, 119, oil tank 120, integrated oil path block header 121, and oil pipes, joints, packing, etc. Among them, strainer 118, oil pump 13, overflow valve 15, electric motor 11, and strainer 119, oil pump 14, overflow valve 16, electric motor 12 acting mutually as standby units. The hydraulic accumulator 116 stores pressure oil pumped by oil pump 13 or 14 when operating valve of SPA equipment is at standstill, and it will supply pressure oil together with oil pump 13 or 14 when the operating valves are in action. Hydraulic accumulator 117 is installed for stabilizing the oil pressure of oil return pipe system. Overflow valve 15 or 16 and throttle valve 111 are used to regulate the pressure and flow of the output pressure oil respectively. The back pressure valve 112 is used to regulate the oil pressure in the oil return pipes. Integrated oil path block header 121 is rectangular shaped block, provided with tube connections for all solenoid cross-over valves, so that all the solenoid cross-over valve of a plurality of programmable control valve assembly can be mounted together in one location. Oil pump 13, driven by motor 11, sucks oil from oil tank 120 through strainer 118 and pumps out the pressure oil, passing through check valve 17, partly to the solenoid cross-over valve 113 for controlling the operation device 2, and partly to oil lead 124 for supplying oil to operating valve 3 as sealing control pressure oil.

FIG. 2 shows: programmable control valve assembly comprises operation device 2, operating valve 3, sealing control valve 4, and valve position detecting device 5.

Figure 6:
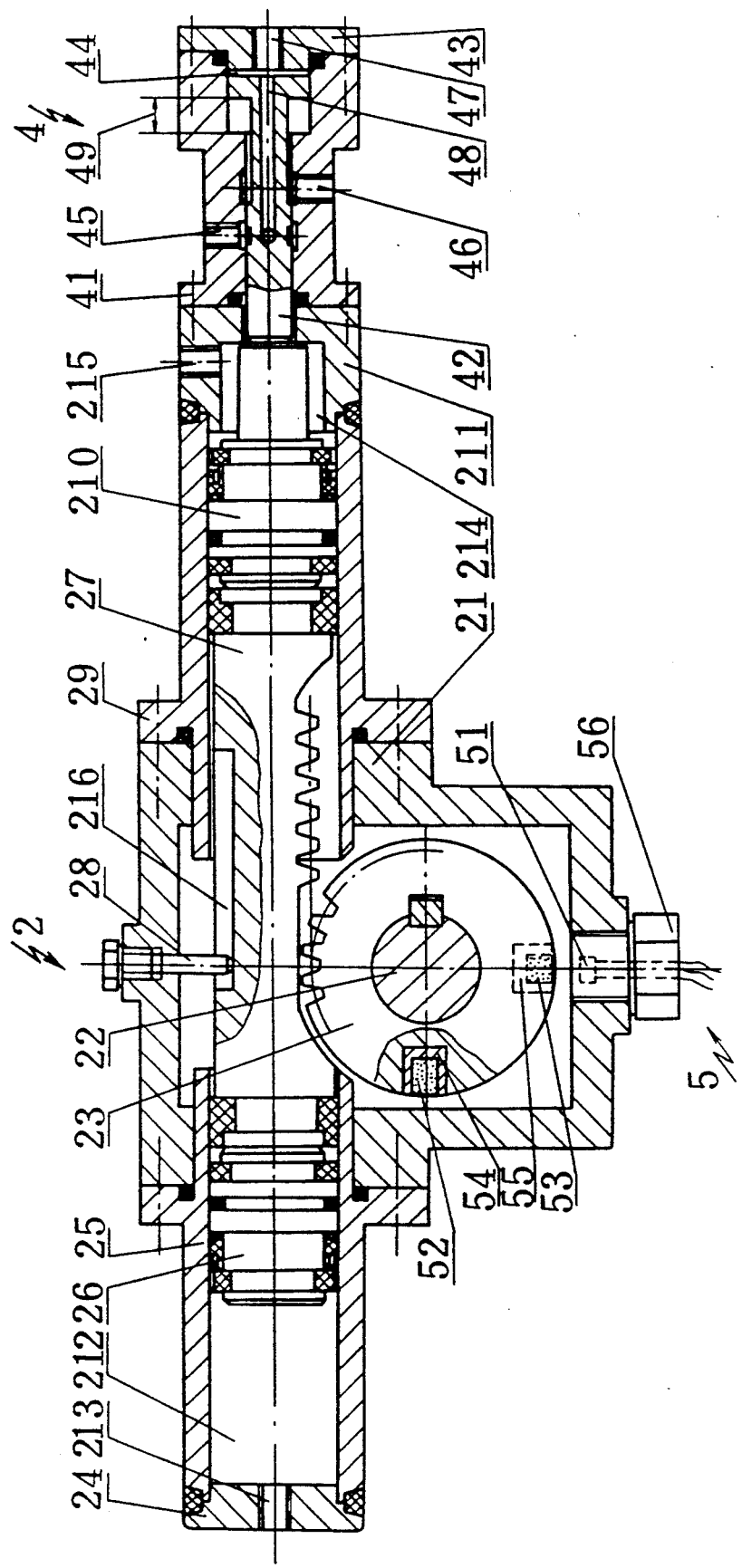
FIG. 6 is a longitudinal cross sectional diagram of operation device and sealing control valve shown in FIGS. 1 and 2.

FIG. 6 shows: the left side operation device 2 comprises box 21, operation shaft 22, pinion 23, left cylinder cover 24, left cylinder 25, left piston 26, rack 27, guide pin 28, right cylinder 29, right piston 210, right cylinder cover 211 and left oil cavity 212, left oil lead 213, right oil cavity 214 and right oil lead 215. The function of the operation device is as follows: by the control of the solenoid cross-over valve 113 (FIG. 5) of the driving device 1, it is used to open or close the operating valve 3, and also control the sealing control valve 4 in accordance with the operating process of the operating valve 3. As the left piston 26 and right piston 210 are disposed separately from rack 27, so the left and right piston 26, 210 will not suffer radial component force of pinion 23 acting upon rack 27 when they are meshed during driving operation of operating valve 3 in opening or closing, thus to increase the sealing function of piston to cylinder. The guide pin 28 on the box 21 engaged with the guiding slot 216 on rack 27, therefore rack 27 can not rotate when it is moving.

The right side sealing control valve 4 shown in FIG. 6 comprises: valve body 41, valve core 42, rear cover 43, and oil cavity 44, oil leads 45, 46 and 47. On valve core 42, there is an oil path 48 to conduct oil from oil lead 45 to the oil lead 47 through cavity 44 when the valve core 42 is at the right position as shown in the figure. When the valve core 42 moves from right to left through a travel 49, oil lead 45 is connected with oil lead 46. The function is that: by the control of the operation device 2, when operating valve 3 (FIG. 8) is at the close state, it makes the sealing control pressure oil supplied by the driving device 1 admitted into cavity for sealing 310 of operating valve 3; when the operating valve is at the open state, or in operation for closing or opening, it makes the cavity for sealing 310 of operating valve 3 connected to the oil return pipe of driving device 1.

Figure 8:
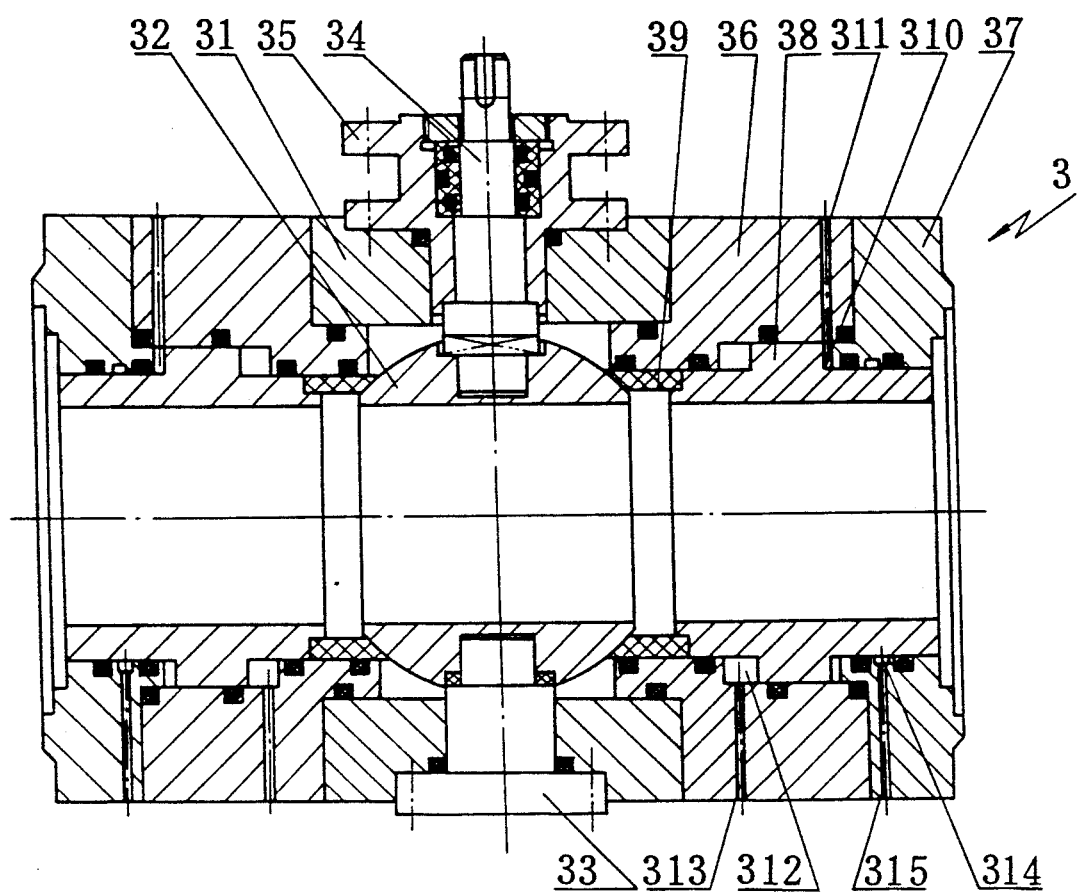
FIG. 8 is a longitudinal cross sectional diagram of an operating valve, showing a spherical valve core.

As shown in FIG. 8, the operating valve 3 comprises: valve body 31, valve core 32, supporting shaft 33, valve stem 34, supporter 35, valve core 36, flange 37, sliding sleeve 38, sealing ring 39. Among them, valve cover 36, flange 37 and sliding sleeve 38 form a cavity for sealing 310 in controlling the sealing state of the operating valve, and a pressure oil lead 311 is also provided. The space between the valve cover 36 and sliding sleeve 38 forms a cavity for leakage 312, and an oil lead 313 leading to the atmosphere is provided. The space between flange 37 and sliding sleeve 38 forms a cavity for leakage 314, and an oil lead 315 leading to the atmosphere is also provided. These two cavities for leakage 312, 314 are designed to avoid sealing control pressure oil in the cavity for sealing 310 to meet the working gas passing through the operating valve and pollute each other.

The left portion of the operating valve 3 is symmetrically with the right portion thereof, there is no need to repeat here.

The operation device 2 shown in FIG. 6 is also provided with valve position detecting device 5, it comprises: electro magnetic transducer 51, magnets 52, 53, magnet seats 54, 55, and joint 56. Among them, magnet seats 54, 55 and joint 56 is made of magnetic shielding materials in order to avoid demagnetizing the magnets 52, 53 and magnetizing pinion 23 and box 21, and hence protect the transducer 51 from giving fault signals. The polarity of magnets 52, 53 is put in opposite to that of the transducer 51. When pinion 23 revolves to open or close the operating valve 3, magnets 52, 53 of opposite polarities to the transducer 51 move approaching to it, hence transducer 51 detects the opening or closing position of the operating valve 3 and feeds back the signal to the computer.

The working process of the programmable control valve assembly is described as follows: couple the valve stem 34 of operating valve 3 with the operation shaft 22 of operation device 2; oil lead 311 of operating valve 3 is connected with oil lead 45 of sealing control valve 4; left and right oil leads 213, 215 of operation device 2 is connected with oil lead 122, 123 of driving device 1 respectively; oil leads 46, 47 of sealing control valve 4 is connected with oil leads 124, 125 of driving device 1 respectively, and finally, connect the solenoid of the solenoid cross-over valve 113 of driving device 1 to the computer.

When the computer orders this programmable control valve assembly working at a close state, the solenoid cross-over valve 113 of driving device 1 works as shown in the figure controlled by the computer allow the pressure oil of driving device 1 to flow from oil lead 122, and oil lead 213 of operation device 2 into the left oil cavity 212, and right oil cavity 214 is connected to the oil return pipe through oil lead 215 and oil lead 123 of driving device 1. At that time, the left piston 26 of operation device 2, rack 27, right piston 210 works at the position shown in the figure by the pressure oil of left oil cavity 212. Pinion 23 is out of mesh with the rack 27. Right piston 210 pushes back the valve core 42 of sealing control valve 4 to the position shown in the figure, and lets the sealing control pressure oil supplied by the driving device 1 flow through oil leads 124, 47, oil cavity 44, oil path 48, oil lead 45 into the cavity for sealing 310 of operating valve 3, drive the sliding sleeve 38 to push sealing ring 39 in butt contact against valve core 32, and hence provides the operating valve with very good hermetization. At the same time, pinion 23 of operation device 2 makes the N-pole of magnet 53 of valve position detector 5 facing transducer 51, and hence the transducer 51 sends a signal to computer indicating that operating valve 3 is now at the close position.

When the programmable control valve assembly is required to turn from close to open, the computer issues an instruction to solenoid cross-over valve 113 driving device 1 and the solenoid cross-over valve 113 changes it operation direction, pressure oil from the driving device 1 flows through oil lead 123 and oil lead 215 of operation device 2 into the right oil cavity 214, oil from the left oil cavity 212 flows through oil lead 213 and 122 of driving device 1 to the oil return pipe. At that time, by the action of pressure oil in the right oil cavity 214, the right piston 210 pushes rack 27, the left piston moves to left, and hence, by the action of pressure oil in oil cavity 44, the valve core 42 of sealing control valve 4 following the right piston 210 moves to left, and stops when it passes the travel 49, then the sealing cavity 310 of operating valve is connected to the oil return pipe through oil lead 311, oil lead 45, 46 of sealing control valve 4, and oil lead 125 of driving device 1, therefore the pressure of sealing control oil in the cavity for sealing of operating valve is greatly reduced, and hence the force exerted on valve core 32 by sealing ring 39 through sliding sleeve 38 is also greatly reduced. The right piston 210 still pushes rack 27, the left piston 26 moves to left, thus rack 27 engaged with pinion 23 and turns pinion 23 for 90°. Then, left piston 26 contacts the left cylinder cover 24, and the left piston 26, rack 27, right piston 210 move to the end. When pinion 23 rotates 90°, then the valve stem 34 and valve core 32 both rotate 90° through transmission of operation shaft 22, and hence the operating valve 3 opens. The 90° rotation of pinion 23 also makes the S-pole of magnet 52 of the valve position detector facing the transducer 51, and transducer 51 issues a signal to the computer that the operating valve 3 has now opened.

If the programmable control valve assembly is required to turn from open to close, the computer issues a signal to control solenoid cross-over valve 113 of driving device 1, and solenoid valve 113 turns back to the position shown in the figure, the connection of oil path is the same as that of the above-mentioned close position. Hence, it is not necessary to repeat here. The operation procedure is as follows: the left piston 26 of operation device 2 pushes rack 27 by the action of pressure oil in oil cavity 212. The right piston 210 moves to the right and turns valve core 32 through the transmission of pinion 23, operation shaft 22 and valve stem 34. When the valve core 32 rotates 90° and reaches the closed position, pinion 23 is disengaged with rack 27, and the left piston 26 continues to push rack 27, right piston 210 moves to the right to the position shown in the figure, the right piston 210 forced back the valve core 42 of the sealing control valve 4 to the position shown in the figure, and the operating valve 3 returns back to its close position.

Through regulating the pressure of pressure oil and return oil by the overflow valve 15 or 16, and the back pressure valve 112 of the driving device 1, it is easily realized to regulate or control the close or open state and the closing or opening operation of the operating valve 3, and also regulate the force exerted on sealing ring 39 to valve core 32.

When there is wear in sealing ring 39 and valve core 32, the sliding sleeve 38 of operating valve 3 may automatically push more by the pressure oil of oil cavity 32 to compensate the wear clearance.

The above-mentioned working procedure may greatly increase the hermetization, life and reliability of the operating valve 3.

Figure 1:
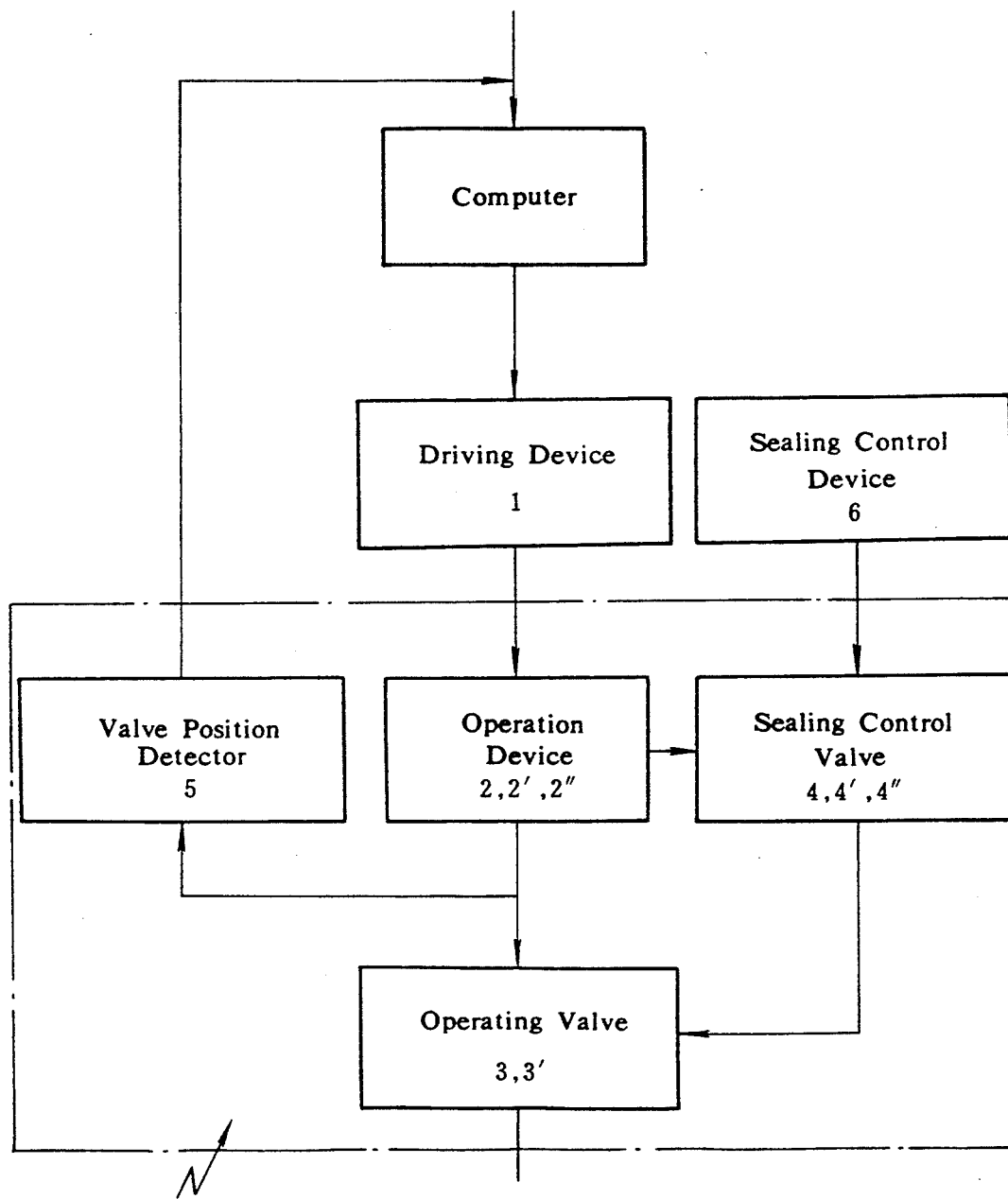
FIG. 1 is a block diagram showing the programmable control and operation equipment of SPA.
Figure 14:
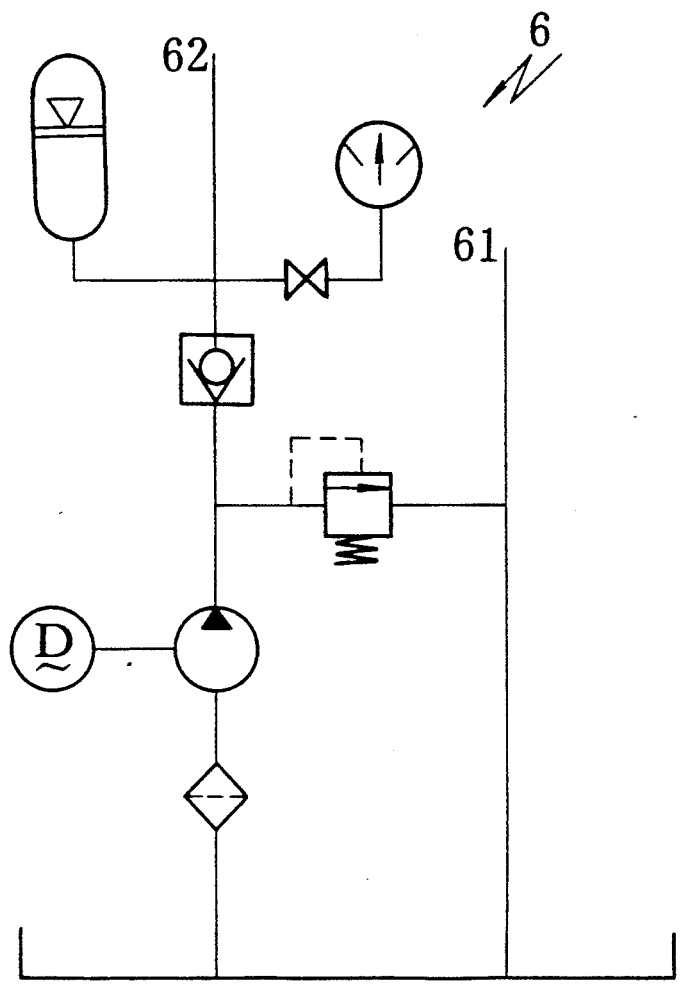
FIG. 14 shows the working principle diagram of a sealing control device.

The foregoing mentioned is the preferred embodiment of what the present invention shows. However, the different parts of the present invention of SPA programmable control and operation equipment may have come modified embodiments as shown below:

(1) The sealing control pressure oil supplied by the driving device 1 may also be supplied by an independent sealing control equipment 6, as shown in FIG. 14, comprising similar parts as the driving device 1. The difference is only that, oil lead 46, 47 (FIG. 6) are connected to oil leads 61, 62 respectively. FIG. 1 shows the block diagram of such SPA programmable control and operation equipment.

(2) The sealing control pressure oil supplied by driving device 1 may be replaced by either raw gas or product gas of SPA.

Figure 7:
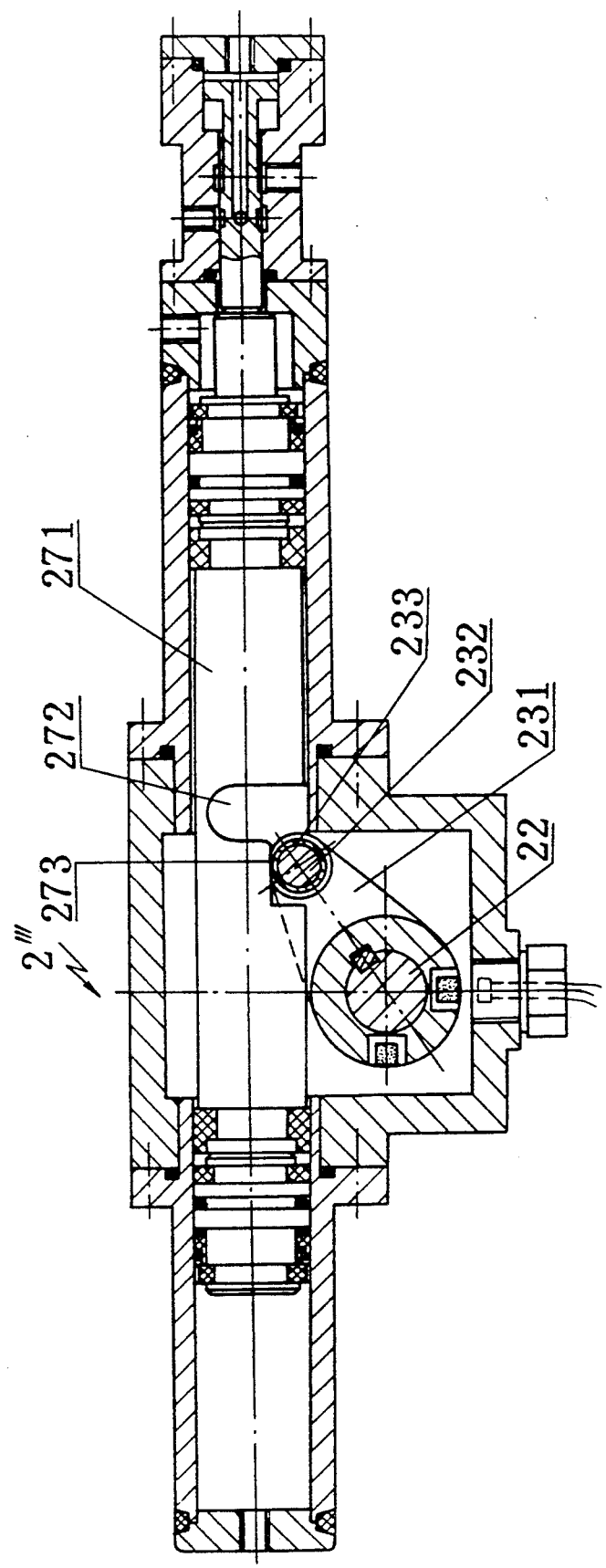
FIG. 7 is a longitudinal cross sectional diagram of a modified embodiment of the operation device shown in FIG. 6.

(3) The operation device 2 (FIG. 6) may be replaced by that shown in FIG. 7. The difference is that: change the pinion and rack mechanism in operation device 2 to fork and push rod mechanism, which comprises fork 231, pivot 232, roller 233, push rod 271 and its slots 272 and flat edge 273. When the push rod 271 moves, roller 233 slides in the slot 272 and on the flat edge 273, hence the fork 231 rotates by the motion of pivot 232 and makes the operating valve 3 open or close, and it also controls the change over of the sealing control valve 4.

(4) The operating valve 3 (FIG. 8) may also be a butterfly valve, which differs from the globe valve in that: butterfly valve comprises valve body, disc valve core, supporter, and valve stem. The sealing control is realized by the cavity distributed around the sealing ring of the valve core periphery.

In the above-mentioned modifications 1, 2, 3 and 4, the control system of each equipment is the same as foregoing mentioned, and hence will not be described any more.

Figure 3:
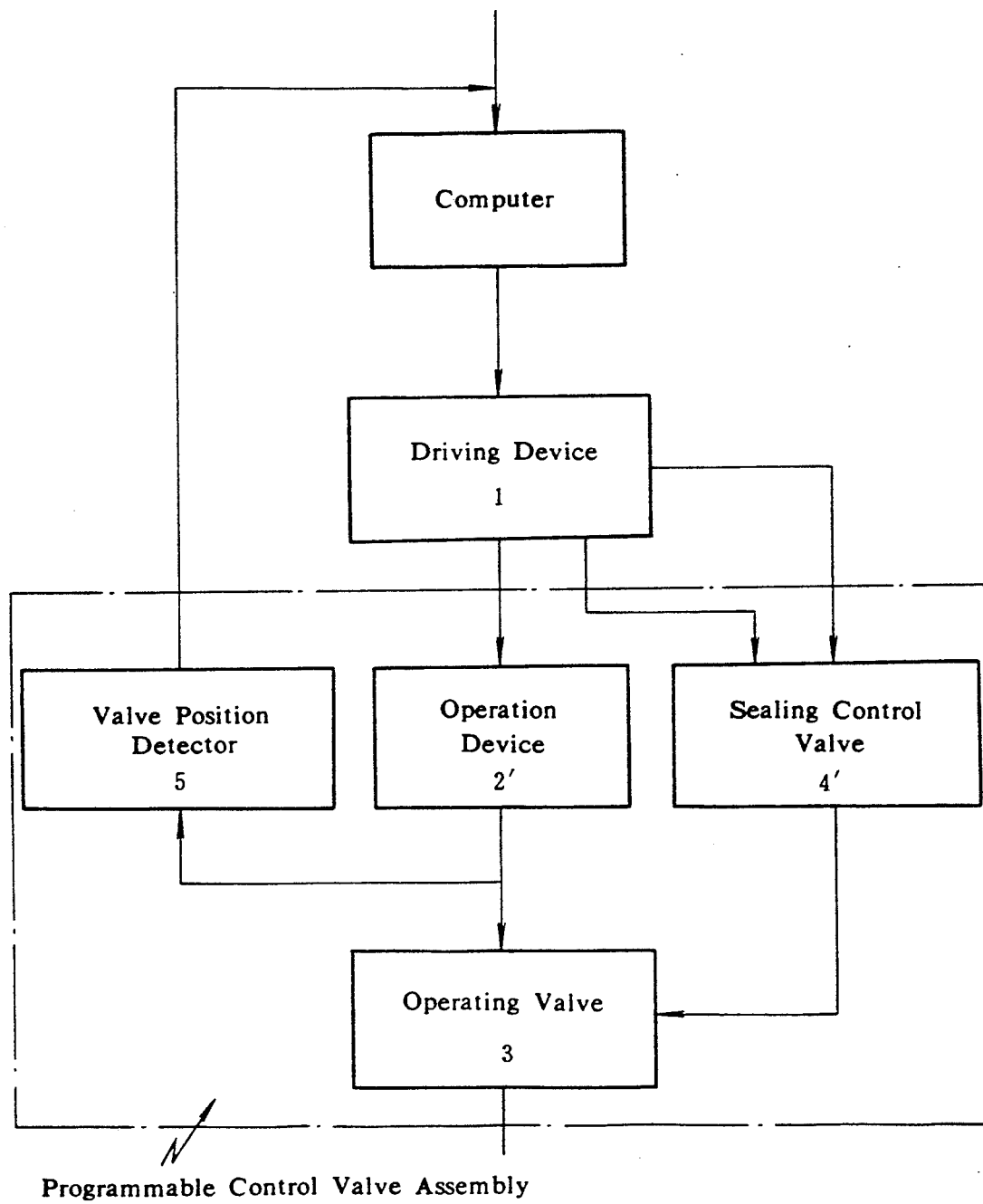
FIG. 3 is another block diagram with modified embodiment of FIG. 1.
Figure 9:
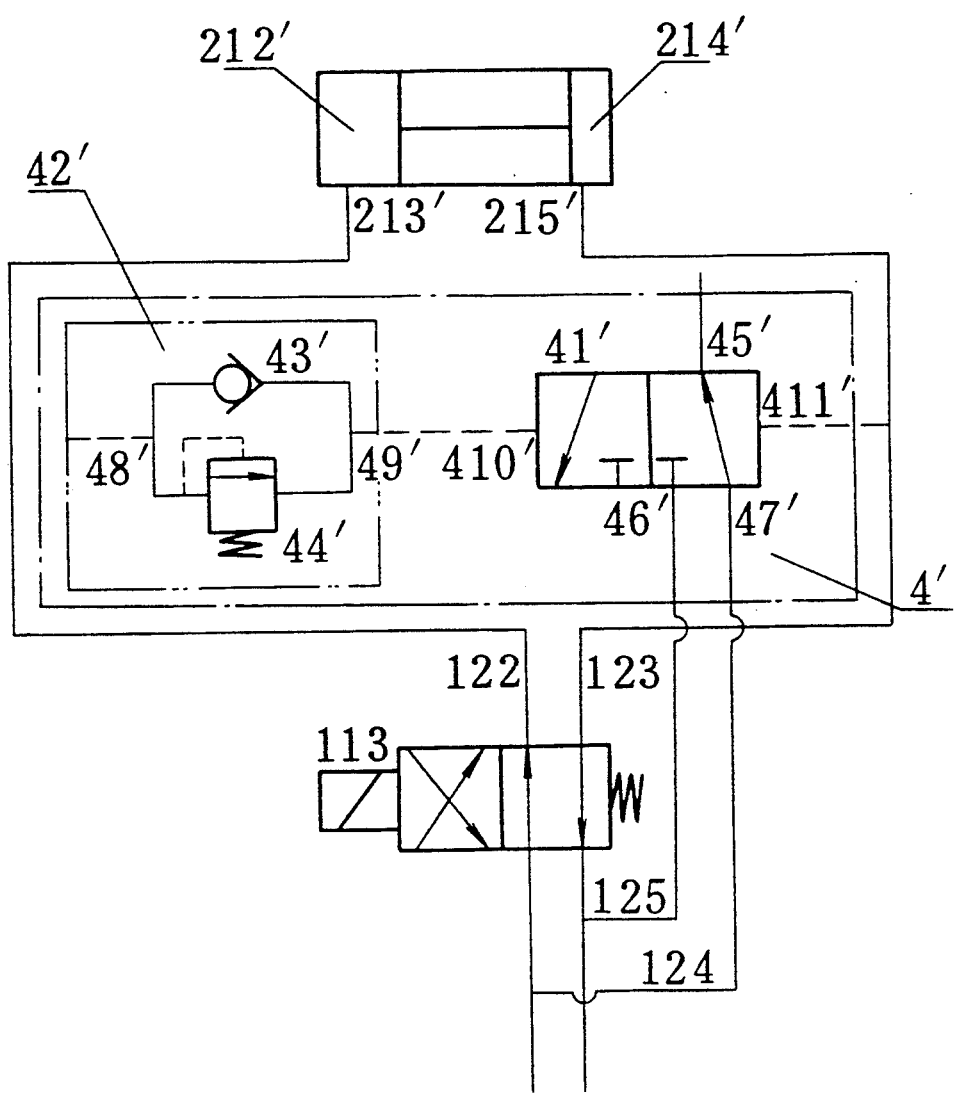
FIG. 9 is a schematic diagram showing the working principle of part of the driving device and the sealing control valve of FIG. 3.

(5) The sealing control valve 4 in FIG. 6 may also be changed to the sealing control valve 4' shown in FIG. 9. The block diagram of corresponding programmable control and operation equipment of SPA is shown in FIG. 3. The operation device 2 (FIG. 6) is changed to the operation device 2' shown in FIG. 11.

The sealing control valve 4' shown in FIG. 9 comprises cross-over valve 41', single flow programmable valve 42' and oil leads 45', 46', 47', 48' 49', 410' and 411'. The difference between this one and the sealing control valve in FIG. 6 is that: pressure oil supplied by driving device 1 may flow through oil leads 122, 48', programmable valve 44' of single flow programmable valve 42', oil leads 49', 410' and enters into the left end of cross-over valve 41' or enters into the right end of cross-over valve 41' through oil leads 123, 411' to change over the operation of cross-over valve 41'.

Figure 11:
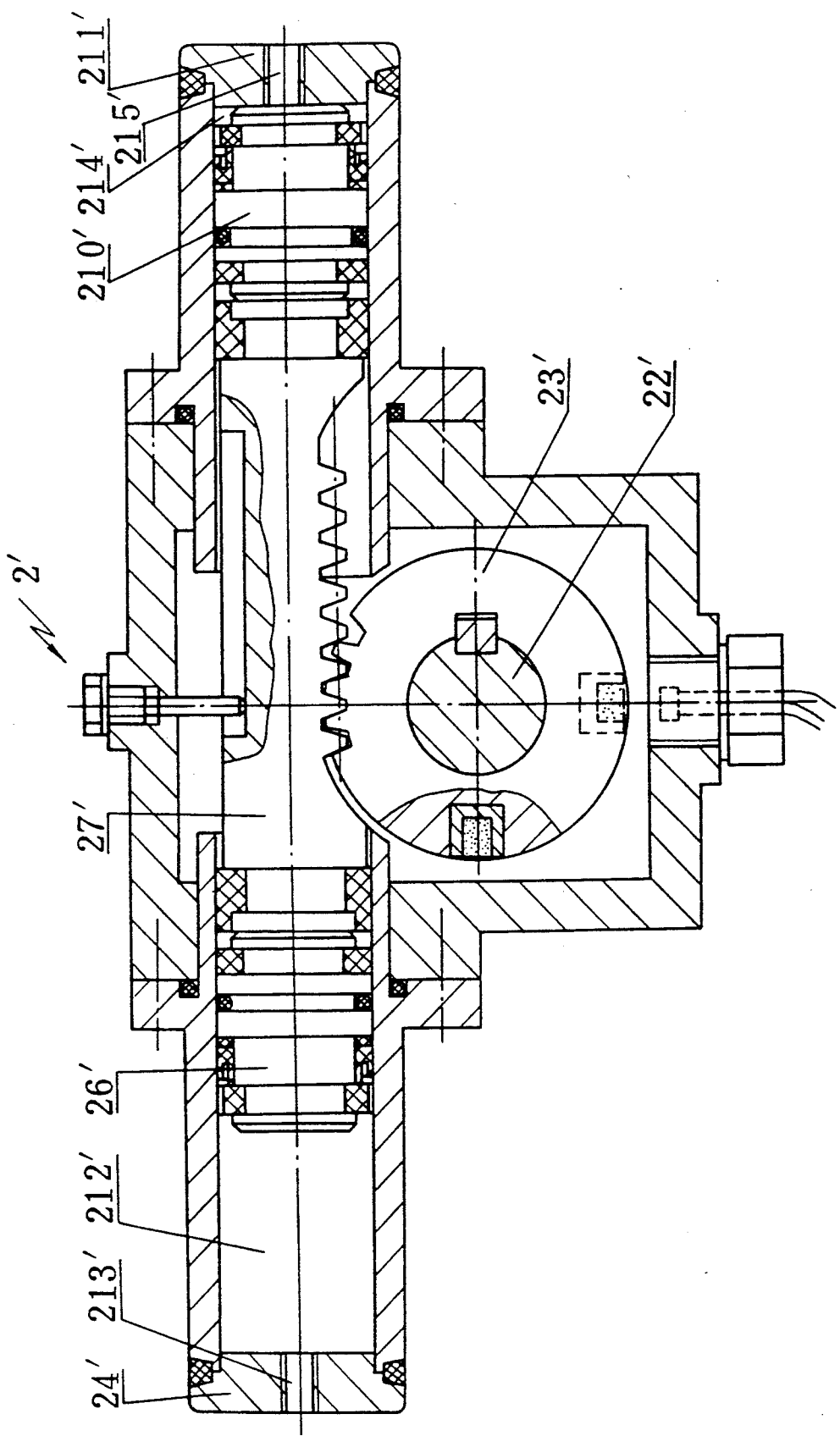
FIG. 11 is a longitudinal cross sectional diagram of the operation device of FIGS. 3 and 4.

The operation device 2' of FIG. 11 comprises: pinion 23', operation shaft 22', left cylinder cover 24', left piston 26', rack 27', right piston 210', and right cylinder cover 211', and also left oil lead 213', right oil lead 215', left oil cavity 212', and right oil cavity 214 $\propto$ 0. It is different from the operation device shown in FIG. 6 in that: rack 27' always meshes with pinion 23' in the whole operation process.

The difference of these operation processes with that of FIG. 2 is described here in detail (See FIG. 3, FIG. 8, FIG. 9 and FIG. 11):

When computer issues instruction to let the programmable control valve assembly hold at close position, pressure oil of driving device 1 flows into the left oil cavity 212' of operation device 2' through oil leads 122, 213', and oil in the cavity 214' is connected to the oil return pipe of driving device 1 through oil leads 215' and 123. Hence, operation device 2' is now at the state shown in the figure, the valve core 32 of operating valve 3 is now at close state. At the same time, pressure oil of driving device 1 flows through oil leads 122, 28', programmable valve 44', oil leads 49', 410' into the left end of cross-over valve 41', and the right end of cross-over valve 41' is connected to the oil return pipe of driving device 1 through oil leads 411', 123, then the cross-over valve 4 1' is at the state shown in the figure and makes pressure oil of driving device 1 connected to the cavity for sealing 310 through oil leads 124, 47', 45' and 311, thus making the sealing ring 39 tightly in butt contact against valve core 32 to insure the hermetization of valve 3.

When computer issues instruction to let the programmable control valve assembly turn from close to open, pressure oil of driving device 1 flows through oil leads 123, 411' and enters into the right end of the cross-over valve 41', and at the same time it enters into the right oil cavity 214' of operation device 2' from oil lead 215' and the left oil cavity 212', through oil leads 213', 122 and is connected to oil return pipe of the driving device 1. The left end of cross-over valve 41' is also connected to the oil return pipe of the driving device 1 through oil leads 410', 49', single direction element 43', oil lead 48', 122. At that time, because the sealing ring 39 of operating valve 3 is tightly in butt contact against the valve core 32, resistance to the moving of right piston 210' of operation device 2', rack 27', left piston 26' is large, therefore the pressure oil of driving device 1 firstly make the cross-over valve 41' to change over, and the cavity for sealing 310 of operating valve 3 is connected to the oil return pipe of driving device 1 through oil leads 311, 45'b' and 125, thus the pressure exerted by sealing ring 39 of operating valve 3 to valve core 32 is greatly reduced. Next, pressure oil of driving device 1 pushes the right piston 210', rack 27', left piston 26' of the operation device to the left till the left piston 26' is in touch with the left cylinder cover 24', and rack 27' drives pinion 23' and operation shaft 22' makes the valve core 32 of operating valve 3 to rotate 90° to the open position, thus operating valve 3 is opened.

When the computer issues instruction to let the programmable control valve assembly turn from open to close, the solenoid cross-over valve 113 of driving device 1 returns back to the state as shown in the figure, the connection of oil pipes is the same as the above-mentioned at close state. Hence, it is not repeated here. At that time, because the setting of resistance force of programmable valve 44' is higher than the resistance to the moving of left piston 26', rack 27' and right piston 210' of the operation device 2', hence the left piston 26' will firstly push rack 27', right piston 210' moving to the right to the position as shown in the figure, rack 27' moves the valve core 32 of operating valve to rotate 90° to the close position, then the pressure oil of driving device 1 opens programmable valve 44', flows through oil leads 49', 410' to the left end of cross-over valve 41', and changes over the cross-over valve 41' to the position shown in the figure, thus operating valve 3 is at the close position.

Figure 4:
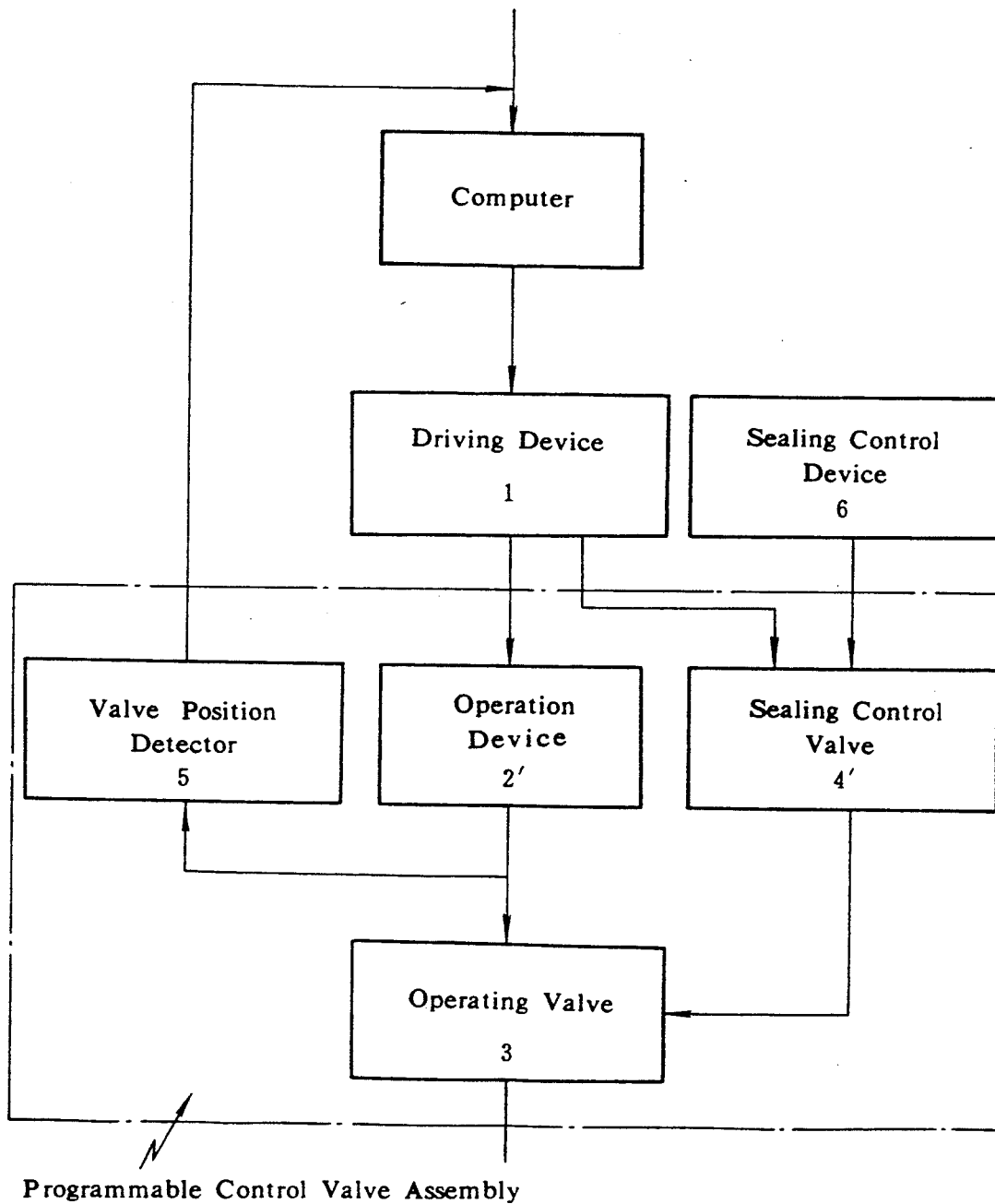
FIG. 4 is another block diagram with modified embodiment of FIG. 1.
Figure 10:
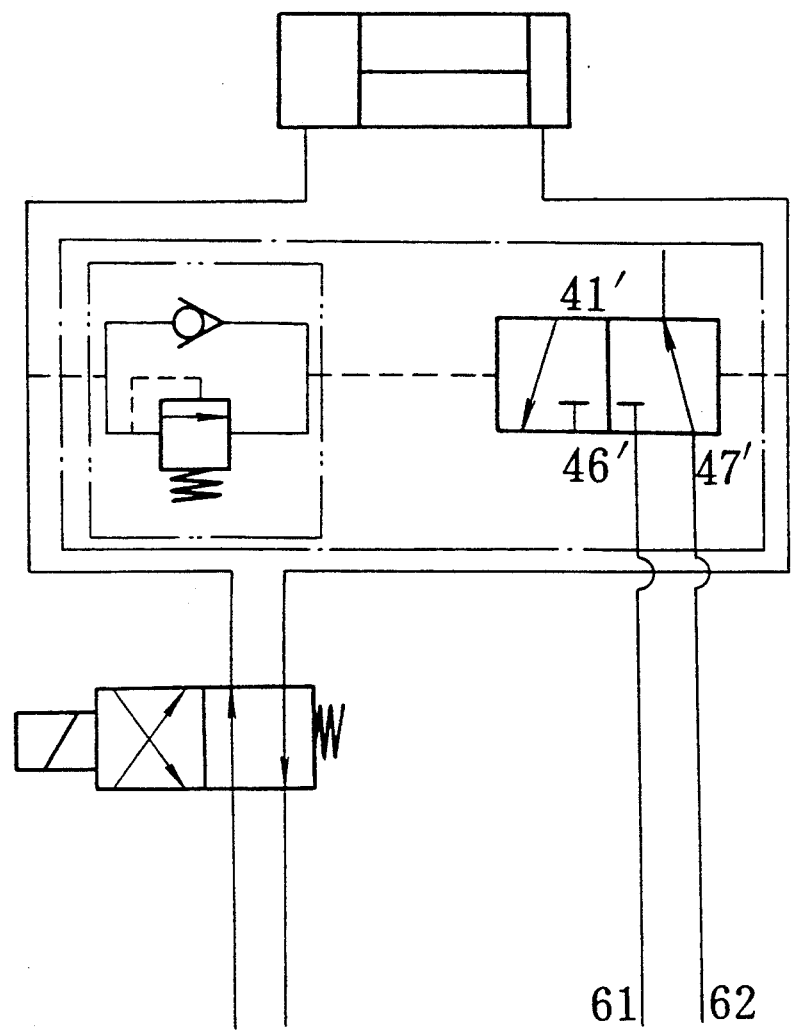
FIG. 10 is a schematic diagram showing the working principle of part of the driving device and the sealing control valve of FIG. 4.

(6) The sealing control pressure oil described above shown in FIG. 3 may also be changed, that is to be supplied by s separately equipped sealing control equipment 6, as shown in FIG. 14. The corresponding block diagram of such programmable control and operation equipment of SPA is shown in FIG. 4. The working principle diagram of sealing control valve is shown in FIG. 10. The difference between this and that of FIG. 3 and FIG. 9 is: sealing control oil supplied by sealing control device 6 flows through oil leads 61, 62 separately into two oil leads 46' and 47' of cross-over valve 41'. The working procedure is the same as described in FIG. 3, hence no more repetition is needed here.

Figure 12:
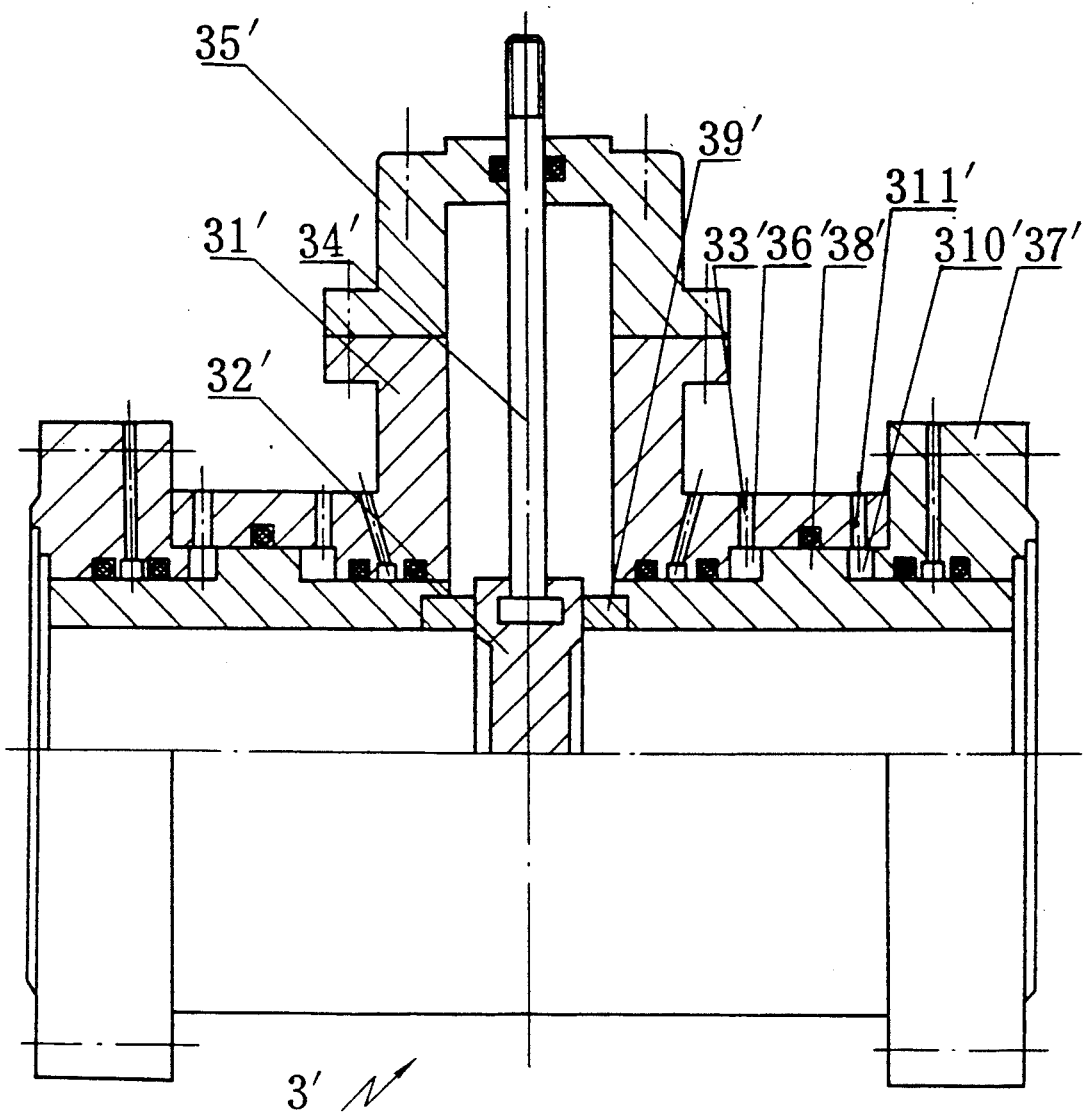
FIG. 12 is a longitudinal cross sectional diagram of an operating valve, showing the valve core being a gate shape.
Figure 13:
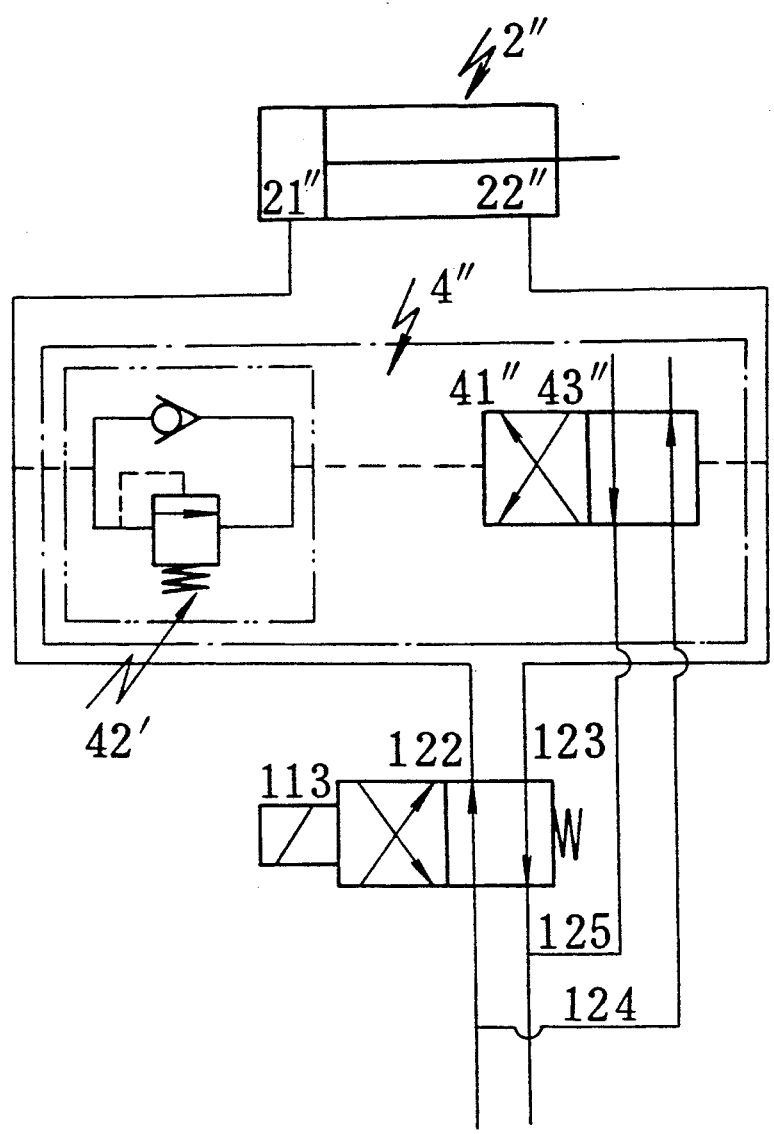
FIG. 13 shows the working principle schematic diagram of the operation device and the sealing control valve in control of the gate shaped operating valve.

(7) Operating valve 3 shown in FIG. 3 may also be changed to operating valve 3' (gate valve) shown in FIG. 12, the corresponding operation mechanism and sealing control valve so shown in FIG. 13.

As shown in FIG. 12, operating valve 3' comprises: valve body 31', valve core 32', valve stem 34', supporter 35', flange 37', sliding sleeve 38' and sealing ring 39', and also cavity for sealing 31 0', oil lead 311', cavity for opening 36', and oil lead 33'. It differs from operating valve 3 in that, a cavity for opening 36' is provided in operating valve 3', and hence when operating valve 3' opens, the sealing ring 39' gets away.

As shown in FIG. 13, the operation device is an oil cylinder 2", which differs from operation device 2' in that the operation device 2" moves to and fro in linear to open the operating valve 3'.

As shown in FIG. 13, sealing control valve 4" comprises one single direction programmable valve 42' and one two position four way cross-over valve 41". It differs from sealing control valve 4' in that, it provides an oil lead 43" which is used to make the sealing ring 39' get away during the operating valve 3' is opening.

The difference of its working procedure from that described in FIG. 3 is that: under the control of operation device 2", the valve core 32' of operating valve 3' moves up and down to open and close the operating valve 3'. When operating valve 3' is at the close position, its cavity for sealing 310' is connected to pressure oil of driving device 1 through oil lead 311', 124, and let cavity for opening 36' connected to oil return pipe of driving device 1 through oil leads 33', 43" and 125, making the operating valve 3' having good hermetization. When operating valve 3' turns from close to open, pressure oil of driving device 1 flows into the cavity for opening 36' of operating valve 3' through oil leads 124, 43" and 33', and the cavity for sealing 310' is connected to the oil return pipe of driving device 1 through oil leads 311' and 125, lets sliding sleeve 38' bring the sealing ring 39' depart from valve core 32', and then pressure oil of driving device 1 flows into the cavity 22" of operation device 2" makes the valve core 32' of operating valve 3' to move upward and open the operating valve 3'. When the operating valve 3' turns from open to close, pressure oil of driving device 1 flows into oil cavity 21" of operation device 2", oil cavity 22" is connected to the oil return pipe of driving device 1, makes the valve core 32' of operating valve 3' return back to close state, and then makes the pressure oil of driving device 1 to come into the cavity for sealing 310' of operating valve 3', and its cavity for opening 36' is connected to the oil return pipe of driving device 1. At that time, pressure oil pushes the sliding sleeve 38' bringing sealing ring 39' to move forward and tightly in butt contact against valve core 32', the operating valve 3' is now at close state.

(8) The above-mentioned operating valve 3' may also be a seated valve, the shape of valve core is a seat plate. Because its sealing construction, working principle and working procedure are the same as that of gate valve mentioned above, it is not repeated here.

While the description of the programmable control and operation equipment of swing pressure adsorption process has been given with respect to preferred embodiments, it is not to be construed in a limiting sense. Many of the details herein given may be varied considerably by those skilled in the art without departing from the spirit and scope of the present invention.

What is claimed is:

1. A programmable control and operation equipment of swing pressure adsorption process, comprising a computer, a driving device, and a plurality of programmable control valve assembly, wherein said programmable control valve assembly comprises an operating valve, a sealing control valve, and an operation device; said operating valve has a valve stem and a valve core, and the periphery of said valve core is provided with a sealing ring situated in a sliding sleeve, the sealing action is controlled by said sliding sleeve along with the sealing ring in butt contact against said valve core, said sliding sleeve is driven by pressure medium inside at least one cavity of said operating valve; said pressure medium in the cavity being at a pressure controlled by said sealing control valve; said operation device simultaneously controlling the operation of said sealing control valve and cooperated open or close state and opening or closing of said operating valve.

2. An equipment according to claim 1, further comprising a sealing control device for supplying sealing control medium to said at least one cavity for sealing of said operating valve.

3. An equipment according to claim 2, wherein said control medium in said cavity for sealing of said operating valve is of raw gas of the SPA system.

4. An equipment according to claim 2, wherein said control medium in said cavity for sealing of said operating valve is of product gas of the SPA system.

5. An equipment according to claim 1, wherein further comprises a valve position detector situated in said programmable control valve assembly used to detect the opening or closing state of said operating valve.

6. An equipment according to claim 1, wherein said operating valve is a globe valve, its valve core is spherical.

7. An equipment according to claim 1, wherein said operating valve is a gate valve, its valve core is a gate plate.

8. An equipment according to claim 1, wherein said operating valve is a butterfly valve, its valve core is a disc plate.

9. An equipment according to claim 1, wherein said operating valve is a seated valve, its valve core is a seat plate.

10. An equipment according to claim 1, wherein further comprises a separation device inside said operating valve to separate working medium of said operating valve with control medium in said cavity for sealing of said operating valve.

11. An equipment according to claim 10, wherein said separation device is of at least one cavity for relieving the control medium.

12. An equipment according to claim 1, wherein said sealing control valve is controlled by said operation device.

13. An equipment according to claim 1, wherein said sealing control valve is controlled by said driving device.

14. An equipment according to claim 1, wherein said operation device comprises cylinders, pistons disposed in said cylinders, and a pinion and rack mechanism, and said pistons and said pinion and rack mechanism being separately disposed.

15. An equipment according to claim 1, wherein said operation device comprises cylinders, pistons disposed in said cylinders and a fork and push rod mechanism, said pistons and said fork and push rod mechanism being separately disposed.

16. An equipment according to claim 1, wherein said driving device is hydraulically operated.

17. An equipment according to claim 16, wherein said hydraulically operated driving device comprises an oil source, an oil pump, and an integrated oil path block header having a plurality of oil paths, said programmable control valve assembly including a plurality of solenoid cross-over valves connected to said oil paths, and said oil path block header connecting said oil paths to said cross-over valves.

18. An equipment according to claim 16, wherein said sealing control device is part of said hydraulically operated driving device.

* * * * *